(12) United States Patent
De Vries (10) Patent No.: US 7,481,087 B2
(45) Date of Patent: Jan. 27, 2009

(54) SAFETY INTERLOCK SYSTEM

(75) Inventor: Jurrien Henri Pierre De Vries, Breda (NL)

(73) Assignee: Alcumbrella Holding B.V., Breda (NL)

( * ) Notice: Subject to any disclaimer, the term of this patent is extended or adjusted under 35 U.S.C. 154(b) by 0 days.

(21) Appl. No.: 11/139,320

(22) Filed: May 27, 2005

(65) Prior Publication Data

US 2005/0262910 A1   Dec. 1, 2005

(30) Foreign Application Priority Data

May 28, 2004   (NL)   ................................. 1026291

(51) Int. Cl.
 *E05B 27/00* (2006.01)
 *E05B 29/00* (2006.01)
(52) U.S. Cl. .............................. 70/491; 70/127; 70/167
(58) Field of Classification Search ........... 70/166–167, 70/491, 89, 356, 127–128
See application file for complete search history.

(56) References Cited

U.S. PATENT DOCUMENTS

| 1,851,986 | A | * | 4/1932 | Rubsamen | 70/491 |
| 2,655,029 | A |   | 10/1953 | Borda |   |
| 2,782,625 | A | * | 2/1957 | Williams | 70/455 |
| 2,993,361 | A | * | 7/1961 | Van Lahr | 70/491 |
| 3,485,069 | A | * | 12/1969 | Pilvet | 70/419 |
| 3,599,455 | A | * | 8/1971 | Pilvet | 70/123 |
| 3,808,853 | A | * | 5/1974 | Helenurm | 70/411 |
| 3,992,907 | A | * | 11/1976 | Pilvet | 70/491 |
| 4,006,615 | A | * | 2/1977 | Szova | 70/491 |
| 4,147,905 | A | * | 4/1979 | Scherbing | 70/491 |
| 4,977,768 | A | * | 12/1990 | Embry | 70/491 |
| 4,996,856 | A | * | 3/1991 | Lin et al. | 70/491 |
| 5,209,088 | A |   | 5/1993 | Vaks |   |
| 5,351,514 | A | * | 10/1994 | Recio | 70/491 |
| 5,904,057 | A | * | 5/1999 | Abney et al. | 70/167 |
| 7,007,522 | B1 | * | 3/2006 | Lee | 70/491 |

FOREIGN PATENT DOCUMENTS

| EP | 0073862 A1 | 3/1983 |
| EP | 0591661 A | 4/1994 |
| FR | 783163 A | 7/1935 |
| FR | 2604471 A | 4/1988 |
| GB | 2207219 A | 1/1989 |

OTHER PUBLICATIONS

"International Search Report Application No. NL 1026291", 6 Pages.

* cited by examiner

*Primary Examiner*—Patricia L Engle
*Assistant Examiner*—Christopher Boswell
(74) *Attorney, Agent, or Firm*—Schwegman, Lundberg & Woessner, P.A.

(57) ABSTRACT

The present invention provides a safety interlock system for mechanically securing an industrial process or appliance, including a lock which can be unlocked with a key, wherein the key comprises one or more key code elements which can be positioned in different positions and the selected position of the key code elements corresponds with a specific key code, and wherein the lock comprises one or more lock code elements which can be positioned in different positions and the selected position corresponds with a specific lock code, wherein the lock is locked except when the key code is identical to the lock code when the key is inserted.

30 Claims, 4 Drawing Sheets

FIG. 3

SAFETY INTERLOCK SYSTEM

RELATED APPLICATION

This application claims priority under 35 U.S.C. 119 from Dutch Patent Application No.: NL 1026291 filed May 28, 2004, which is incorporated herein by reference and made a part hereof.

FIELD

The present invention relates to a safety interlock system for mechanically securing an industrial process or appliance.

BACKGROUND

Interlock systems are known for securing industrial processes or appliances wherein a safe sequence of operations relating to an industrial process or an appliance is ensured by means of a number of locks. An example of a safety interlock system is a lock which locks an access door to an electrical installation. In order to gain access to the electrical installation itself, the door must be opened. The door can only be opened by unlocking the lock. However, the release movement of the lock simultaneously causes an interruption in the power source of the installation (so-called "power interlocking") or operates a control circuit with which the power source is disconnected from the electrical installation ("control interlocking"). The interlock system ensures that access is gained to the electrical installation only when it is not in operation and cannot therefore cause any hazard for its environment. In another example of an interlock system, both the switch for switching the power source on and off and the access to the electrical installation are provided with a locking mechanism. With a first key the user can unlock the locking mechanism of the power supply switch and then switch off the power source. The power source is locked in the switched-off state by removing a second key from the locking mechanism, with which second key the locking mechanism of the access can be unlocked. The electrical installation is then accessible. The second key herein remains retained in the access locking mechanism until the access is once again closed and locked. Only when the access in the closed state is unlocked can the second key be removed from the access locking mechanism. The second key is now available to unlock the power supply locking mechanism and switch the power source on again. Depending on the situation and the specific application, there are many possible variants of the above stated safety systems, which can all guarantee an adequate security.

Safety interlock systems are also applied in locking and unlocking closing valves in a chemical plant. A closing valve provided with an interlock system can be locked in the closed position (locked closed system) and/or locked in an opened position (locked open system). By providing closing valves with an interlock, undesired operation thereof can be prevented. It is also possible, using the locking mechanism on a number of different closing valves, to ensure a correct, pre-determined sequence of closing or opening of the closing valves, for instance so as to prevent hazardous situations.

The safety system is for instance applied in process installations which are provided with pressure relief systems for safeguarding a pressure vessel. In order to switch off these pressure relief systems for repair or maintenance it is required to isolate these systems by means of blocking valves. If these blocking valves are operated in the wrong sequence, the pressure vessel can become blocked, which can result in a dangerous overpressure. When for instance the pressure relief system of a determined pressure vessel requires maintenance, the pressure vessel must first be connected to an alternative pressure relief system by opening a first valve and locking it in the opened position thereof, while the original pressure relief system can only then be switched off by unlocking a second valve and then closing it. In order to ensure this specific sequence of opening and closing for valves, a user first collects a key from a central control area and unlocks the interlock system of the first valve with this key. The first valve can then be opened, and by locking the first valve in the opened state a second key becomes available which in turn can be removed from the interlock system. The second key is subsequently used to unlock the second valve locked in the opened position, whereafter the second valve can be closed. In this situation the original pressure relief system is switched off, but the alternative pressure relief system is guaranteed to be in operation. No hazardous overpressure situation can hereby occur in the pressure vessel.

Many other types of safety interlock system are known. Some of these are fully integrated with the appliance for controlling, such as for instance a shut-off valve, while other interlock systems are supplied independently of the process or appliance to be controlled, and wherein they can act on the appliance in numerous ways so that a correct control of the appliance is ensured.

The known interlock systems do however have a number of drawbacks. A first drawback is that many different components are required to give the keys and locks unique key and lock codes. This makes the system complex and requires an expensive manufacturing process.

In addition, the different components must be made code-specific relatively early on in the production process. This usually means that the safety systems are already made unique in the factory. A drawback here is that once the known systems have been fitted, any adjustment of or addition to the safety system, when a key is lost or in the case of a possible increase in the number of keys, a separate set of keys must be manufactured in the factory. This means extra transport costs and takes a relatively long time. This is problematic, especially when the system is intended to act on an appliance in a remote location or difficult to reach. When the safety interlock system is for instance applied in safeguarding a process on a drilling platform, it is in most cases difficult or time-consuming to send the keys from the mainland to the platform.

A further drawback of the existing systems is that making the lock and the key unique requires mechanical processing of a number of components of the system, wherein a mechanical process usually entails a number of machining operations. This means that special processing equipment, with which for instance the machining operations on the lock and the key can be performed, must be available at or in the vicinity of the location of use. Such processing equipment is however not normally available on-site.

There is a need to to provide a safety interlock system in which the above stated drawbacks of the prior art, among others, are obviated.

SUMMARY

According to an aspect of the invention, key code elements and lock code elements that may be positioned in different orientations are provided such that the lock code and key code of a lock and a key can be adjusted manually and without the requirement of machining of the lock and/or the key.

According to an aspect of the invention, there is provided for this purpose a safety interlock system for securing an industrial appliance operative in a safety mode or an operational mode, including:

a lock including a lock housing and an operating component arranged rotatably in the lock housing, wherein the operating element is adapted to cooperate with the appliance so as to bring the appliance as a result of rotation of the operating component from the operational mode in the safety mode and wherein the operating component is provided with one or more lock code elements which can be positioned in different positions to be selected, wherein the selected positions of the lock code elements correspond to a specific lock code;

a key for unlocking the lock, wherein the key comprises one or more key code elements which can be positioned in different positions to be selected and the selected position of the key code elements corresponds with a specific key code, wherein the lock is adapted so as to lock the operating component with respect to the slot housing except when the key code is identical to the lock code when the key is inserted.

The operating component remains locked and keeps therefore the appliance in the operational mode until a key with the right key code is inserted into the lock. In such a case the appliance can be brought in the safety mode by rotating the operating component. By using key code elements and lock code elements that may be positioned in different orientations, the lock code and key code of a lock and a key can be adjusted manually and without possible machining of the lock and/or the key.

Since no processing is necessary in making the lock and the key unique, this unique-making process can be performed not only in the factory but also in simple manner on-site. A further advantage of the making the lock and the key unique by positioning key code elements and lock code elements in correct manner is that all components of the system, including the lock code and key code elements, can be produced serially, which results in a reduction of the production costs.

One will appreciate that the operational mode and safety mode are dependent on the type of appliance to be secured. In some cases the operation of the appliance is interrupted when the appliance is to be brought in the safety mode, for example by interrupting the supply voltage of the appliance, like for instance in case of the "power interlocking" or "control interlocking" mentioned earlier. The transition of the appliance into the safety mode can be performed in a direct manner, for example because rotation of the operating component directly operates a control circuit or a power supply of the appliance, or can be performed in an indirect manner, for example because rotation of the operating component unlocks safety means (for example a safety fence or safety enclosure), whereafter the power supply of the control circuit can be switched off manually. In other cases the appliance may be changed over from the operational mode to the safety mode by urging a closing valve in the correct (opening or closing) position. In other cases the operating component is adapted to cooperate with the appliance so that as a result of rotation of the operating component the appliance can be carried from the operational mode to the safety mode.

In an embodiment the operating person can directly control the process or the appliance, for instance because this embodiment is directly or indirectly coupled (via a transmission mechanism) to the appliance for securing or to a control controlling the process. The locking of the operating component can only be interrupted when a fitting key is inserted into the lock. With turning of the fitting key the operating component co-rotates and thereby unlocks the process or appliance. The rotating movement of the operating component simultaneously controls the process or the appliance, for instance by interrupting the supply voltage, closing a valve (locked open system) or opening a valve (lock closed system).

In an embodiment the rotating movement ensures, as set forth above, that the appliance is unlocked and can thereby be operated.

According to an embodiment, the lock code elements are formed by elongate lock pins and the operating component is provided with one or more slots in which the pins can be held in different positions rotated about the longitudinal axis. Each of the different positions hereby defines a unique lock code. In an embodiment the key code elements can be formed in analogous manner by elongate key pins which can be fixed in different positions in corresponding slots in the key. Each of the positions of a key in a slot once again defines a unique key code.

There are many possible ways of arranging the lock and key code elements in their respective slots. In an embodiment, the pins have a part with a rotation-symmetrical cross-sectional form (for instance a polygonal shape) and the slots are embodied with a corresponding form so that the pins can slide close-fittingly into the slots. The rotation-symmetrical form makes it possible to realize a desired coding in very simple manner. When the pins for instance form a hexagon in cross-section (comparable to the peripheral form of a socket-head screw) the pins can be arranged in the slot in six different positions. Six codes can in this case be defined per pin. In the case of a cross-sectional heptagonal form, the pins can be arranged in the slot in seven positions, and so on. Other forms with rotation-symmetrical cross-section, such as for instance a star shape, other polygons, or the like, are also envisaged.

Moreover, by providing the slots themselves at unique, rotation-asymmetrical positions in the operating component and in the key, the key can only be inserted into the lock in one position, thereby preventing incorrect key-lock rotation orientation. Alternatively or additionally hereto, the lock and/or the key are provided with one or more positioning elements so as to ensure that the key can only be inserted into the lock in one orientation. In this embodiment the slots themselves can be provided at rotation-symmetrical positions in the lock and the key.

In an embodiment, the key code elements and the lock code elements are arranged in the slots in respectively the key and the lock upright as well as upside down in order to provide different key codes and lock codes. This ensures that the number of possible unique codes is multiplied by two. When the form of a first outer end of a key code element for instance differs from the form of the opposite outer end, it will always make a difference whether the key code element is arranged upright or upside down in the slot. The length of a first outer end of the key code element can also differ from the length of the opposite outer end thereof. In this case there is also a distinction between a key code element arranged upright or upside down in the relevant slot.

The key and/or lock code elements are, in an embodiment, embodied more generally such that the code elements have a rotation-asymmetrical form relative to a radial axis thereof. A number of preferred positions is hereby defined in rotation round the radial axis. Each of the preferred positions corresponds with a separate key code and lock code. As a result of the fact that the form and/or dimensions of the key code elements and lock code elements are not rotation-symmetrical, the number of possible unique codes can be multiplied by the stated number of preferred positions. In the described embodiments, in which the form of the lock code and key code elements are chosen such that they can be arranged upright as well as upside down in the key and two preferred positions can therefore be defined, the number of possible unique codes is multiplied by two. It is generally the case that when n (n=2, 3,. . . ) preferred positions can be defined, the total number of possible unique codes is multiplied by n.

BRIEF DESCRIPTION OF DRAWINGS

Further advantages, features and details of the present invention will be elucidated on the basis of the description of a preferred embodiment thereof. Reference is made in the description to the figures, in which.

DETAILED DESCRIPTION

Figure 1A:
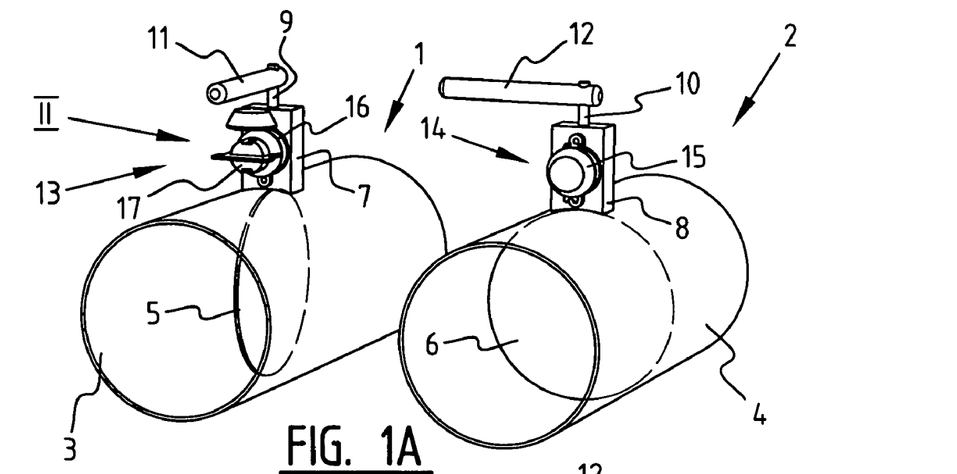
FIGS. 1A-1C show an example of application of the invention on two closing valves.
Figure 1B:
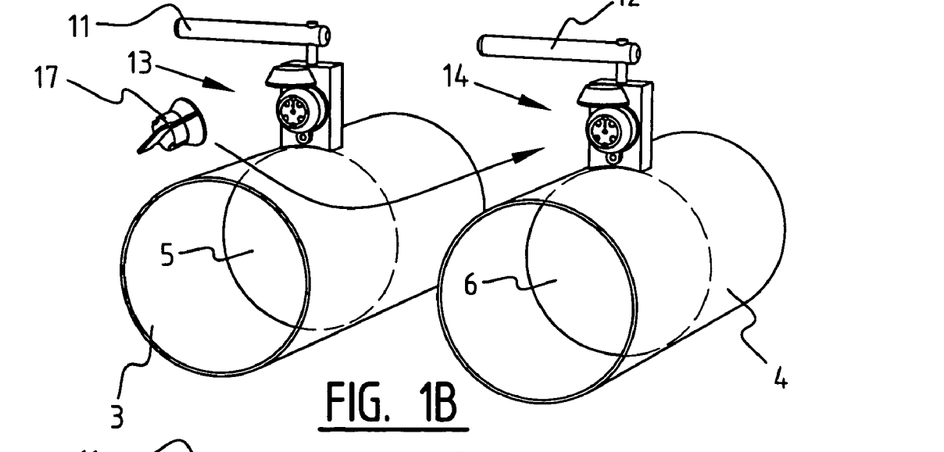
Figure 1C:
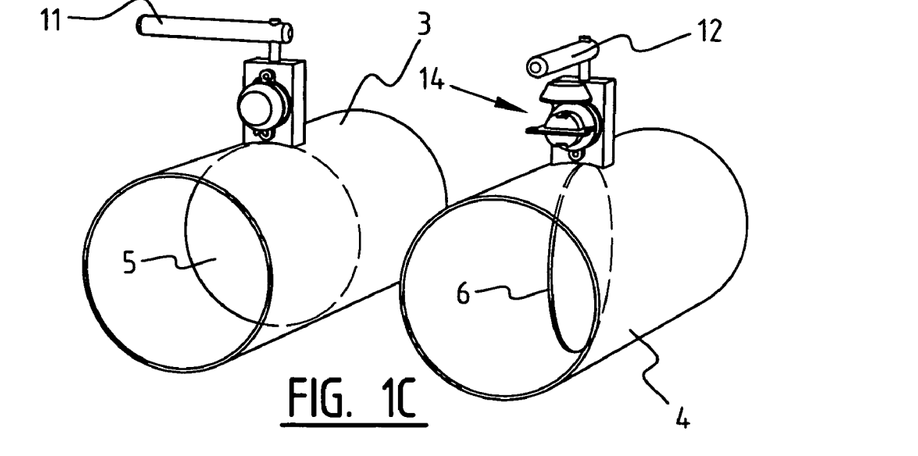

FIGS. 1A-1C show an embodiment of the interlock system which is applied to the specific example of two closing valves in liquid and/or gas pipelines of a petrochemical plant. A left-hand part 1 is shown which consists of a pipeline 3 along which liquid and/or gas can be carried. The pipeline can be closed using a valve 5 which is mounted rotatably on pipeline 3. Valve 5 is arranged on a support 7 through which protrudes a rotation shaft 9. Rotation shaft 9 can be operated manually using a handle 11. On support 7 there is provided a first safety system 13 with which the valve can be fixed in a determined position. In similar manner the right-hand part 2 consists of a conveyor pipeline 4 in which a valve 6 is arranged rotatably. For this purpose conveyor pipeline 4 is provided with a support 8 on which a second safety system 14 is arranged. Valve 6 can be manually operated via a rotation shaft 10 using handle 12.

In the example situation shown in FIG. 1A, valve 5 is opened so that the liquid and/or gas can flow freely through conveyor pipeline 3. Valve 6 of the right-hand part 2 is however closed. In the shown embodiment the left-hand valve 5 is locked in the opened position, while the right-hand valve 6 is locked in the closed position. This means that when no key 17 of safety system 13, 14 is available, valves 5, 6 remain locked in respectively opened and closed position. In this condition the opened valve 5 and closed valve 6 are in their "normal" or operational mode. When the key 17 associated with the left-hand and the right-hand safety systems 13, 14 is however available, valve 5 can be unlocked by operating the left-hand safety system 13, whereafter the valve can be closed by operating handle 11. The situation in which valve 5 is closed is shown in FIG. 1B. The same key 17 is then used to unlock the second safety system 14, whereby it is made possible to open the right-hand valve 6 by operating handle 12. This situation is shown in FIG. 1C. In this condition wherein the valve 5 is closed and valve 6 is opened, the valves are in the safety mode. Unauthorized persons who do not have key 17 at their disposal are thus prevented from being able to operate valves 5, 6 incorrectly, for instance by opening valve 6 before valve 5 is closed, whereby undesired or even dangerous situations could result.

In another embodiment it is possible to envisage the safety system 13 being embodied such that key 17 can then only be removed from the left-hand safety system 13 when the left-hand valve 15 is locked in the closed position. Only then can the same key 17 be used to unlock the right-hand safety system 14, whereby it is made possible to open the right-hand valve 6. In this embodiment there is therefore mechanical safeguarding of operation of the valves, whereby it is only possible to open and close the valves in a specific sequence.

In the embodiment shown in FIGS. 1A-1C the safety system 13, 14 is integrated with a valve mechanism in a conveyor pipeline. As already indicated above however, there are many alternative possible embodiments and applications of the safety system. In another embodiment (not shown) the safety system is arranged to safeguard an access door to a housing of a machine. The safety system locks the door and thereby prevents any access to the machine until the door is unlocked using a correct key. Only when the door is unlocked can an operative gain access to the machine. During the unlocking movement the supply voltage of the machine is however interrupted, or the machine control is instructed to switch the machine off. In another embodiment (not shown) the supply voltage source is first switched off and locked in the switched-off position. After the locking a key becomes available with which the locked access door to the machine can be unlocked, so that the operative can gain access to the machine. In both cases an operative is thus prevented from gaining access to a machine that is operating, this being undesirable in view of the safety risks involved.

Figure 2:
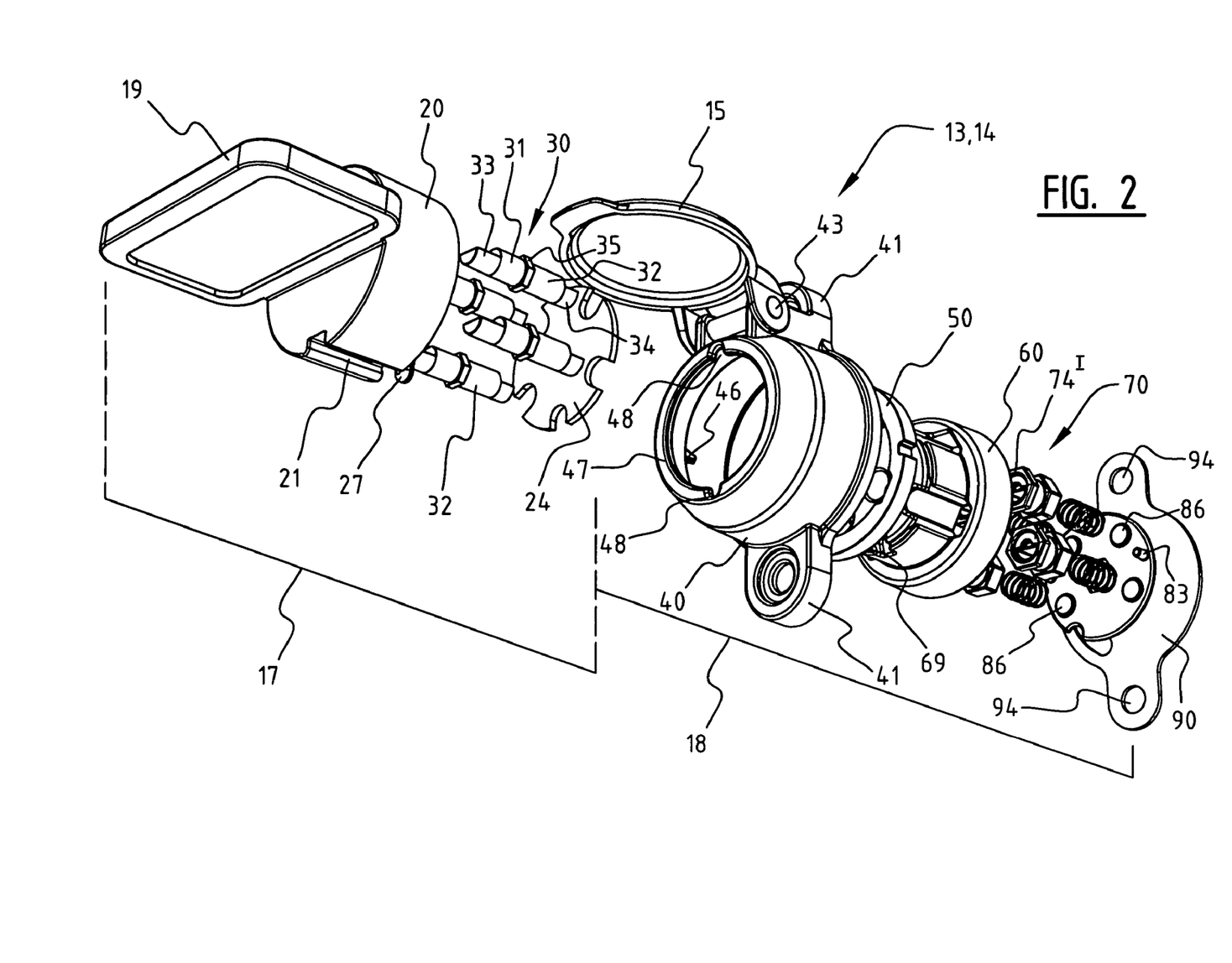
FIGS. 2, 3 and 4 show exploded perspective views of an embodiment of a lock and a key according to the invention, wherein the different figures are made from different angles of view.
Figure 3:
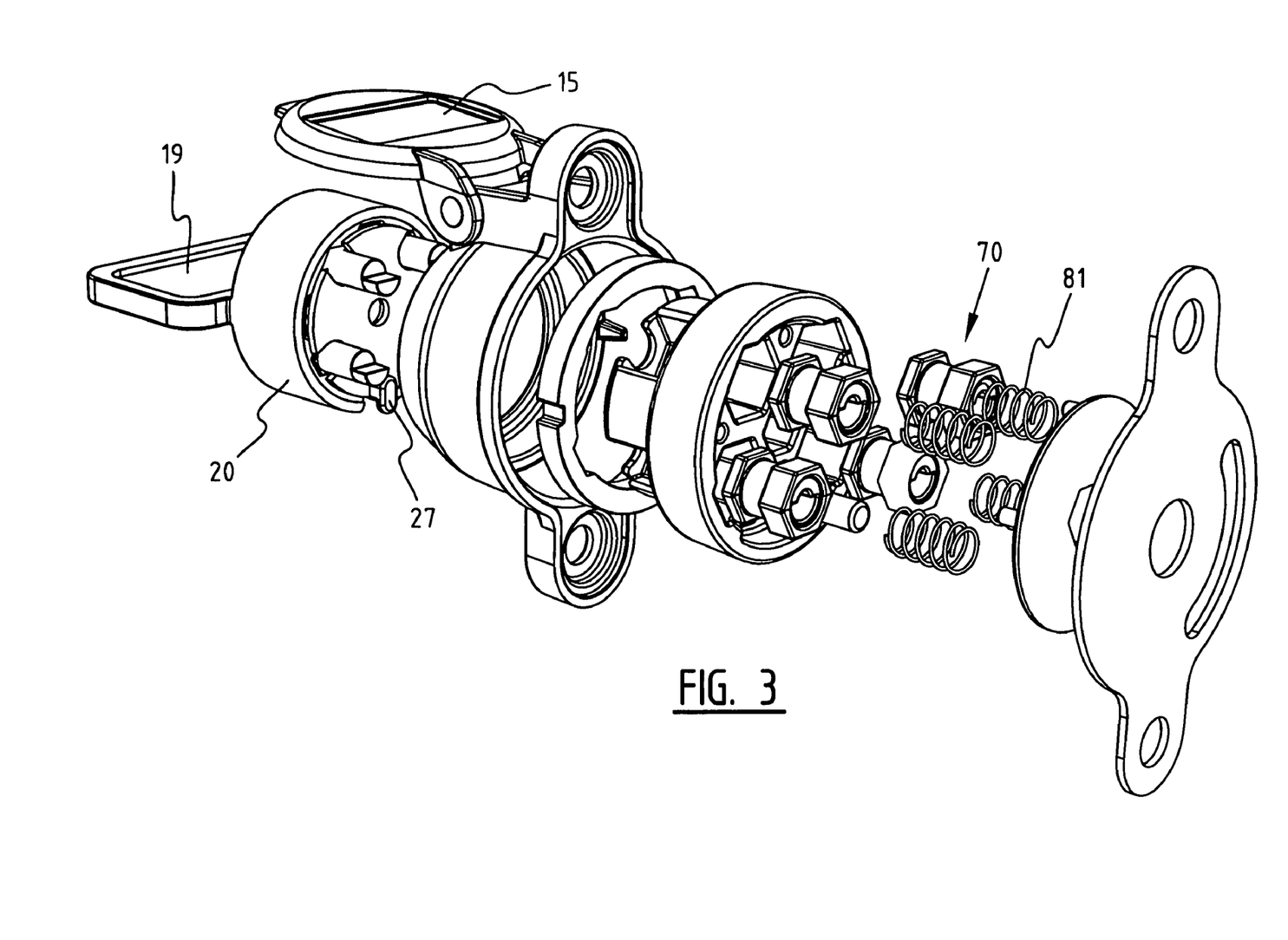
Figures 4, 5A, 5B, 6:
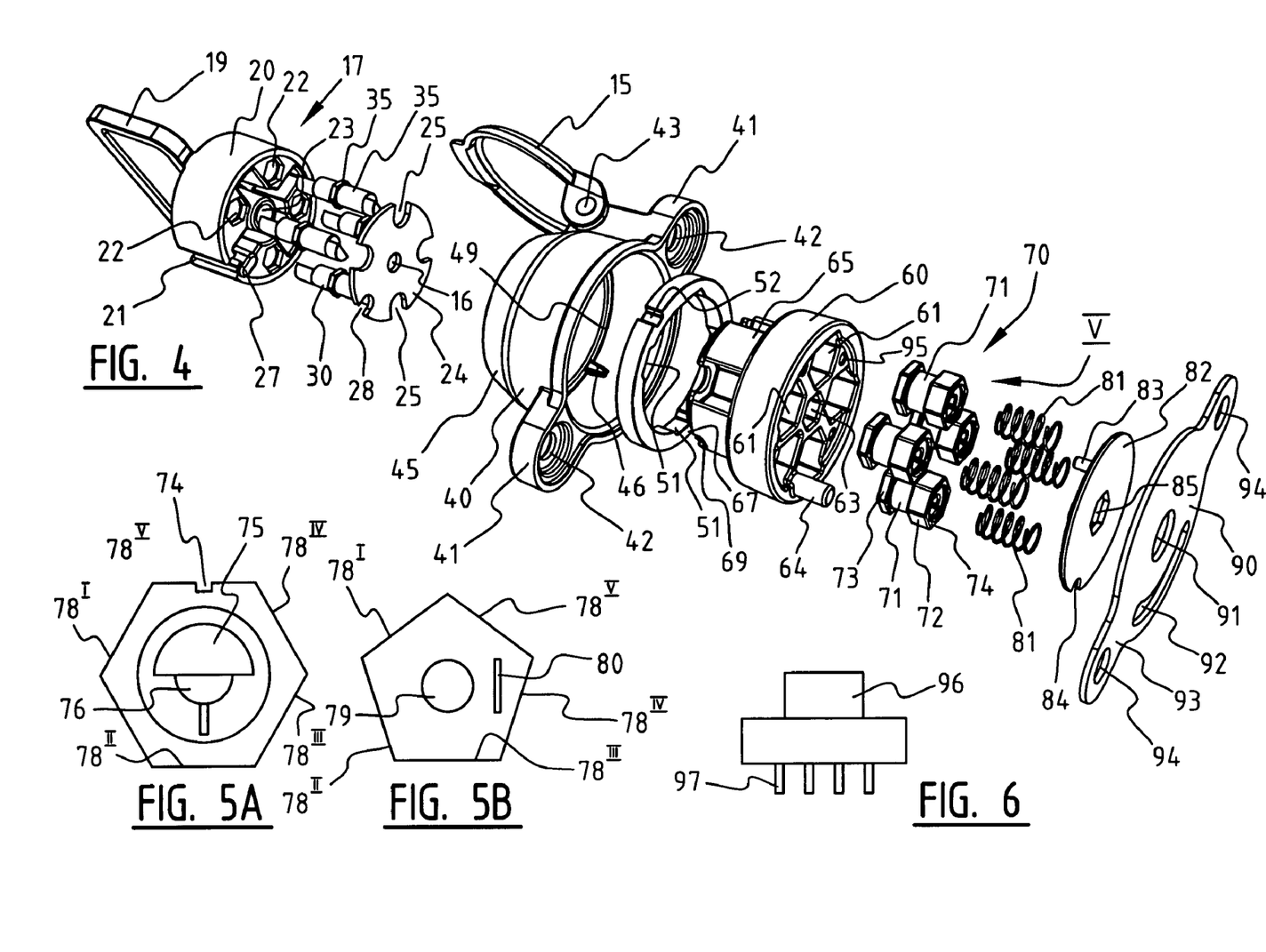
FIG. 5A is a top view of a first embodiment of the lock pin.
FIG. 5B is a top view of a second embodiment of the lock pin.
FIG. 6 shows a schematic view of a master key.

FIGS. 2-4 show an embodiment of a safety system 13, 14 according to the invention. The system comprises a key 17 which can be encoded and at least one lock 18 which can be encoded. Key 17 is constructed from a housing 20, on the upper side of which is provided an engaging element 19. Four slots 22 are provided in the underside of housing 20. In the shown embodiment slots 22 have a hexagonal cross-section. Key pins 30 can slide into key slots 22. Key pins 30 are elongate elements consisting of a relatively short part 31, a relatively long part 32 and a ring 35 therebetween. Ring 35 has a hexagonal form in cross-section corresponding with the hexagonal form of key slots 22. A half-moon shaped end part 33 is provided on the outer end of the small part 31, while a half-moon shaped end part 34 is provided on the outer end of the large part 35. When all pins 30 are arranged in pin slots 22 in correct manner, as will be described hereinbelow, the underside of key housing 20 is covered with a cover plate 24. Cover plate 24 is fixed by arranging a breakable locking pin 26 in an opening 23 provided in key housing 20. After the locking pin has been broken off, cover plate 24 and thereby the key pins 30 pushed into slots 22 can no longer be removed without damage.

Cover plate 24 is provided along its periphery with notches 25. Notches 25 are provided at the positions corresponding with the positions of key slots 22 in key housing 20, and moreover have dimensions such that either the small end part 31 or the large end part 32 of each of the pins 30 can slide through the notches and the ring 35 functions in mounted position as a stop so that the pins remain retained in the key.

Key housing 20 is further provided with one or more positioning projections 27 which are provided with a lip-shaped outer end and the function of which will be set forth below. Along the peripheral edge of cover plate 24 there is arranged a notch 28 which corresponds with projection 27 and which extends along projection 27 in the mounted position of cover plate 24.

Lock 18 includes an outer housing 40, on either side of which protrude support parts 41. Support parts 41 are provided with openings 42 along which fastening screws (not drawn) or the like can be guided. Outer housing 40 can hereby be attached to a random surface (not drawn). Further provided on outer housing 40 is a hinge 43 with which a pivotable cover flap 15 is pivotable. Hinge 43 is preferably provided with a spring which urges the pivotable cover flap 15 back to the closed position so as to protect the lock as much as possible against harmful outside influences. The upper part 45 of outer housing 40 is provided with an end edge 47 in which two notches 48 are provided. These notches 48 provide space for projections 27 on key 17 so that the key can slide into lock pin holder 40. Once the key has been turned however, the lip of a projection 27 comes to lie behind end edge 47, with the result that key 17 can no longer be removed from the lock. In the shown embodiment the key 17 can no longer be removed from the lock when the lock is unlocked. In other embodiments (not shown) the key can on the other hand no longer be removed from the lock when the lock is in the locked position.

A subsequent component of lock 18 is a ring 50 of dimensions such that, when ring 50 is pushed from the underside into outer housing 40, it lies against an edge 49 provided on the inner periphery of outer housing 40. Along its peripheral surface the ring is further provided with two notches 52 into which can engage projections 46 provided on the inner periphery of outer housing 40, under edge 49. Projections 46 and notches 52 ensure that ring 50 cannot rotate relative to outer housing 40. Ring 50 is further provided on its inner periphery with four notches 51. When the ring is arranged in the correct manner, notches 51 are situated at positions corresponding to those of lock slots 22.

Lock 18 further comprises a lock pin holder 60 which is provided with a raised portion 65. Four slots 61 are provided in lock pin holder 60 and raised portion 65. The position of slots 61 corresponds with that of key slots 22 in key 17 and likewise have a polygonal cross-section (in the shown example hexagonal). End part 66 of slots 61 and notches 51 are formed such that a polygonal cross-section is once again provided in the fitted position.

In the centre of locking pin holder 60 there is provided an opening 63 in which an operating shaft (not shown) can be arranged. In the position of use the operating shaft is connected to the appliance for safeguarding or to a device with which the process for securing can be controlled. In the case of the embodiment of FIGS. 1A-1C the operating shaft is for instance coupled to a locking mechanism with which the rotation of shaft 9, 10 of respective valves 5, 6 can be locked. In other embodiments the operating shaft is for instance connected to an electric switch with which the supply voltage to the machine for safeguarding can be switched on and off. These examples must not be deemed to be limiting. It is possible to envisage numerous different embodiments which are optimal for the many different applications. It will be apparent that all embodiments and applications lie within the range of the skilled person and that the invention is not limited to the specific described examples.

A cover plate 67 is provided on the upper side of locking pin holder 60, i.e. on the upper surface of support 65. In the peripheral edge of cover plate 67 there are once again arranged notches 68, the form and dimensions of which are such that the above stated large or small parts 35, 31 of key pins 30 can pass therethrough. The dimensions are however somewhat smaller in cross-section than those of slots 61 so as to ensure that the lock pins 70 to be described hereinbelow are retained in slots 61. Further provided in the peripheral edge of cover plate 67 is a recess 69 in which the above mentioned projection 27 of key 17 can engage. On the underside of key pin holder 60 is arranged a dowel 64, the function of which is described below.

Lock pins 70 can be pushed into the slots 61 of polygonal cross-section. The outer periphery of lock pins 70 corresponds with the outer periphery of slots 61 so that pins 70 can be displaced close-fittingly in the slots. Lock pins 70 consist of a relatively short end part 73 and a relatively long end part 72 with a recess 71 therebetween. Lock pins 70 can slide into the slots with their short end parts 73 first, but can also be pushed into slots 61 upside down, i.e. with the long end part 74 first. Compression springs 81 are further provided which in the fitted state press lock pins 70 into slots 61 until the stop 74 of the relatively long end part 72 or stop 74' of the relatively short end part 73 is stopped by cover plate 67.

The above mentioned springs 81 are mounted on a plate 82, this by pushing the springs over protrusions 86 provided on the plate. Other methods of mounting the springs can however also be envisaged. Along the peripheral edge the plate 82 is provided with notch 84 in order to provide space for dowel 64, and with a central opening 85 along which the above stated operating shaft (not shown) can be guided. Since the central opening has a form corresponding to the cross-section of the operating shaft and because pin 64 fits into notch 84, plate 82 co-rotates with the rotation of pin holder 60.

Plate 82 is provided with a protrusion 83, which in the fitted state is placed in one of the openings 95 provided on the underside of lock pin holder 60 so that plate 82 and lock pin holder 60 remain fixed relative to each other, even when forces are exerted on lock pin holder 60.

Finally, lock 18 includes a stationary base plate 90 for fastening to the surface. Base plate 90 is provided on either side with supports 93 in which openings 94 are arranged. Openings 94 correspond with the above stated openings 42 in outer housing 40, so that the fastening screws (not shown) can also pass through openings 94.

Plate 90 is further provided with central opening 91 to provide space for the operating shaft (not shown). The dimensions and form of central opening 91 are herein chosen such that the operating shaft can rotate freely in opening 91. A round slot 92 is further provided to provide space for dowel 64 on the underside of lock pin holder 60. Slot 92 functions here as guide for dowel 64, so that a smooth rotating movement of pin holder 60 is ensured.

The operation of the system is as follows. As already stated above, the pin holder 60, which is provided with a number of slots 61 placed at rotation-asymmetrical positions, is placed on base plate 90 of lock 18. Lock pins 70 are pushed into these slots 61. Lock pins 70 can be arranged in the slots in different positions rotated on their longitudinal axis. In the shown embodiment, in which the short end parts 73 and long end parts 72 have a hexagonal cross-section and the corresponding recesses 61 likewise have a hexagonal cross-section, lock pins 70 can each be positioned in six different positions. As already stated above, lock pins 70 can moreover be placed upright as well as upside down in slots 61, which doubles the number of possible positions (therefore twelve in the shown embodiment). Due to the different lengths of end parts 73, 74 the recess 71 in lock pin 70 herein comes to lie at two different positions (heights) relative to pin holder 60.

Ring 50 is then placed round support 65 of lock pin holder 70, the notches 51 of which are positioned relative to slots 63 in such a manner that lock pins 70 can be guided therealong.

As discussed above, key pins 30 can be positioned in key 17 round their longitudinal axis at a number of different positions. In the shown embodiment, each of the pins 30 can be arranged in six positions. The number of positions can once again be multiplied by two when the pins can be arranged both upright and upside down in slots 21 and the parts 33, 32 of each of the pins have a different length.

The outer ends of key pins 30 are provided with end parts 33, 34 which have a rotation-asymmetrical form (in the shown embodiment a half-moon shape), while lock pins 70 are provided with recesses 75 which have a complementary form to end parts 33, 34 of key pins 30. This means that a key pin 30 and a lock pin 70 only fit together in one way. Each of the above stated possible positions of lock pins 70 and key pins 30 will therefore respectively define a unique lock code and key code. The number of possible key and lock codes depends on the number of definable rotation positions of pins 70, 30 multiplied by two owing to the fact that the pins can be arranged in the relevant slots in two ways due to their mirror-asymmetrical form (in 180 degree rotation on a radial axis), and on the number of key pins and lockpins in key 17 and lock 18. The above stated multiple rotation of pins 30, 70 in preferred positions in both axial direction and radial direction results in the number of different lock and key codes being equal to $N=(Q*R)^P$, wherein Q is the number of axial rotation preferred positions (in the shown embodiment six), R is the number of radial positions (in the shown embodiment two), and P the number of key/lock pins (in the shown embodiment four). The number of codes which can be obtained with the system according to the shown preferred embodiment is therefore $(6*2)^4=20,726$ in the shown example. If more safety is desired, or less safety suffices, the number of lock/key pins, the number of axial rotation positions and the number of radial rotation positions can be respectively increased and decreased.

Pin holder ring 50 is provided with notches 51 corresponding with the position of lock pins 70 so that, when the lock is closed, lock pins 70 extend partly in pin holder 60 and partly in notches 51 of ring 50. Ring 50 has a width which is equal to or smaller than the width of recess 71 in lock pins 70. When the correct key 17 is inserted into lock 18, the recesses 71 in all lock pins 70 will be on a level with the ring 50 placed in outer housing 40, whereby pin holder 60 and the plate 82 arranged thereon can rotate about its longitudinal axis. In all other cases one or more of the pins, and specifically the long end 72 of lock pin 70 when the pins are arranged as shown in FIG. 4 or the short end 75 in the case the pins 70 are arranged upside down, will ensure that lock pin holder 60 is blocked. Since lock pin 60 cannot be rotated when blocked, the operating shaft (not shown) for operating the appliance or process is also locked.

In the situation where the key is inserted, projection 27 on key 17 comes to lie in recesses 28 of cover element 24 and opening 69 in the peripheral edge of support 65 of key pin holder 60. This ensures that the key can always be inserted into the lock in only one fixed position, and prevents an incorrect key-lock rotation orientation.

In the shown embodiments the key and the lock can be encoded in simple manner by correct placing of respectively key pins 30 and lock pins 70. No special treatments of the lock and/or the key are necessary to make them unique. This provides the option of allowing the lock codes and key codes of the key/lock system to be set by an authorized person on-site, for instance a drilling platform, a petrochemical plant and so on. When a key is for instance lost or otherwise defective, a replacement key can also be made in a relatively short time and without special assist means. Because in the shown embodiment the cover plate 24 is moreover attached by means of breakable locking pins, the system in the shown embodiment is secured against fraudulent operations. Once the key and the lock have been coded the key codes can no longer be changed, or at least not without damage. In other embodiments it is however possible to envisage providing an operative more flexibility and connecting the cover plates 24 releasably to key housings 20, for instance by making use of screws. In that case the operative can modify the key code of key 17 and lock 18 as desired.

Because the key and lock codes can be easily self-set, all components of the key and the lock can in principle be standardized, which enables serial production of the different components of the system and reduces the production costs thereof. For this reason and because no separate operations on components of the key and/or the lock are necessary, the chance of malfunction is smaller since variations resulting from machining errors do not occur in making these unique.

FIG. 5A shows a cross-section through an end part 72, 73 of a lock pin 70. The above mentioned half-moon shaped opening 75 is shown, in which end parts 33, 34 of key pins 30 can engage. Also shown is that lock pin 70 has six flat sides 78, 78I, V, which can slide fittingly into slots 61 in lock pin holder 60.

In the embodiment shown in FIG. 5A an additional recess 76 is provided in addition to the half-moon shaped opening 75. This recess is shallow (for instance 1 to 3 millimetres) and is used to open the lock with a universal key or "master key". A master key 96 for this purpose is shown schematically in FIG. 6, wherein a number of relatively thin master key pins 97 arranged at determined fixed positions are provided on the underside instead of the above stated lock pins 70. These master key pins 97 have a circular cross-section which is embodied such that about half thereof fits into recess 76, which does after all have a semicircular shape. The lock can be opened, irrespective of the position of lock pins 70, by applying master key 96. Pins 97 will after all always press the different lock pins 70 over the correct height along lock pin holder 60 to enable unlocking of the lock. It will be apparent that the option described here of a universal key and the recess 76 intended for this purpose are only provided in specific embodiments. In other embodiments the recesses 76 are omitted.

FIG. 5B shows an alternative embodiment in which there are only five surfaces $78^I$, $78^V$, so that lock pins 70 can be arranged in only five different axially rotated positions in the relevant slots 61. Instead of the single half-moon shaped recess 75 of FIG. 5A there is moreover a circular recess 79 in combination with a rectangular recess 80. When end parts 33, 34 of key pins 30 are each provided with a complementary form to the recesses 79 and 80, i.e. a cylinder and a plate, the lock pins can once again only be arranged in one position relative to key pins 70. It will be apparent that there are numerous ways of having key pins 30 and lock pins 70 engage in each other in unique manner, all of which are within the reach of the skilled person. It is noted that it is moreover not essential to embody the lock pins and key pins such that they only engage in each other in one orientation. Embodiments in which the lock and key pins can mutually engage in a plurality of positions can of course also be envisaged. Such embodiments do however reduce the number of possible lock and key codes.

Embodiments of the present invention include a lock, a key, or an industrial appliance to be secured by one or more safety interlock systems as described herein. In an embodiment, the safety interlock system for securing an industrial appliance operative in a safety mode or an operational mode, includes a lock and a key. The lock has a lock housing and an operating component arranged rotatably in the lock housing. The operating element is adapted to cooperate with the appliance so as to bring the appliance as a result of rotation of the operating component from the operational mode in the safety mode and wherein the operating component is provided with one or more lock code elements which can be positioned in different positions to be selected. The selected positions of the lock code elements correspond to a specific lock code. The key has one or more key code elements which can be positioned in different positions to be selected and the selected position of the key code elements corresponds with a specific key code. The lock is adapted so as to lock the operating component with respect to the slot housing except when the key code is identical to the lock code when the key is inserted. In an embodiment, the lock code elements are formed by elongate lock pins and the operating component is provided with one or more slots in which the pins can be held in different positions rotated about the longitudinal axis. In an embodiment, the key code elements are formed by elongate key pins which can be fixed in different positions in corresponding slots in the key. In an embodiment, the pins have a part with a rotation-symmetrical cross-sectional form and slots have an at least partially corresponding rotation-symmetrical form. In an embodiment, the pins have a part with a polygonal cross-sectional form and slots have an at least partially corresponding polygonal form. In an embodiment, the slots in the operating component and in the key are provided at rotation-asymmetrical positions. In an embodiment, one or both outer ends of a code element have a rotation-asymmetrical form relative to the longitudinal axis thereof. In an embodiment, a code element has a rotation-asymmetrical form relative to a radial axis thereof. In an embodiment, the key pins and lock pins can be arranged in the slots in respectively the key and the lock upright as well as upside down in order to provide different key codes and lock codes. In an embodiment, the form of a first outer end of a key code element differs from the form of the opposite outer end of the key code element. In an embodiment, the length of a first outer end of a key code element differs from the length of the opposite outer end. In an embodiment, a key code element includes an upper and lower stop surface and a recess in the peripheral surface, wherein the difference in distance between the upper stop and the recess and between the lower stop and the recess corresponds with said difference in length of the outer ends of the key code element. In an embodiment, one or both outer ends of a key code element have a fixed form which has a complementary form to one or both outer ends of a lock code element. In an embodiment, the key code element and the lock code element include a half-moon shaped protrusion and the other code element a half-moon shaped recess. In an embodiment, the operating component includes at least one rotatable pin holder and a spindle, wherein the rotation movement of the spindle opens or closes a valve so a to bring the appliance in the operational mode or safety mode respectively. In an embodiment, the operating component is provided with coupler for coupling and uncoupling safety-related contacts of a power supply switch of the appliance for securing so as to bring the appliance in the operational mode or safety mode respectively. In an embodiment, wherein the lock is adapted to interrupt the power supply or to switch off a control circuit of a power supply of the appliance for securing so as to bring the appliance in the safety mode. In an embodiment, closing elements for closing the slots in the key and the operating element are provided, wherein the closing elements are of a type which cannot be removed without being damaged.

The rights sought are not defined by the above described preferred embodiments of the invention, but are defined by the following claims, within the scope of which many modifications can be envisaged.

The invention claimed is:

1. A safety interlock system for securing an industrial appliance operative in a safety mode or an operational mode, comprising:
    a lock including a lock housing and an operating component arranged rotatably in the lock housing, wherein the operating element is adapted to cooperate with the appliance so as to bring the appliance as a result of rotation of the operating component from the operational mode to the safety mode and wherein the operating component is provided with one or more lock code elements which can be positioned in different positions to be selected, wherein the selected positions of the lock code elements correspond to a specific lock code;
    a key for unlocking the lock, wherein the key comprises one or more key code elements which can be positioned in different positions to be selected and the selected position of the key code elements corresponds with a specific key code, the key further including a housing, at least one of the one or more key code elements include at least one pin having an element to hold the rotational position of the pin with respect to the housing, wherein the rotational position of the pin defines one of a plurality of different key codes for the pin at a same depth,
    wherein the lock is adapted so as to lock the operating component with respect to the lock housing except when the key code is identical to the lock code when the key is inserted; and
    wherein the length of the pin defines another of a plurality of different key codes for the pin at a same rotational position; and
    wherein the key codes inclued a plurality of key codes defined by an equation $N=(Q*R)^P$, where Q is the number of axial rotation positions of each of the key pins, R is the number of different depth positions of each key pin, and P the number of key pins.

2. The system as claimed in claim 1, wherein the lock code elements are formed by elongate lock pins and the operating component is provided with one or more slots in which the pins can be held in different positions rotated about the longitudinal axis.

3. The system as claimed in claim 2, wherein the elongate lock pins have a part with a rotation-symmetrical cross-sectional form and the one or more slots have an at least partially corresponding rotation-symmetrical form.

4. The system as claimed in claim 3, wherein the elongate lock pins have a part with a polygonal cross-sectional form and the one or more slots have an at least partially corresponding polygonal form.

5. The system as claimed in claim 2, wherein the key code elements are formed by elongate key pins which can be fixed in different positions in corresponding slots in the key.

6. The system as claimed in claim 5, wherein the key pins and lock pins can be arranged in the slots respectively the key and the lock upright as well as upside down in order to provide different key codes and lock codes.

7. The system as claimed in claim 1, wherein the key code elements are formed by elongate key pins which can be fixed in different positions in corresponding slots in the key, wherein each of the different positions of the key pins defines one key code.

8. The system as claimed in claim 1, wherein one or both outer ends of a code element have a rotation-asymmetrical form relative to the longitudinal axis thereof.

9. The system as claimed in claim 1, wherein the code element has a rotation-asymmetrical form relative to a radial axis thereof.

10. The system as claimed in claim 1, wherein the form of a first outer end of a key code element differs from the form of the opposite outer end of the key code element.

11. The system as claimed in claim 1, wherein the length of a first outer end of a key code element differs from the length of the opposite outer end.

12. The system as claimed in claim 11, wherein a key code element comprises an upper and lower stop surface and a recess in the peripheral surface, wherein the difference in distance between the upper stop and the recess and between the lower stop and the recess corresponds with said difference in length of the outer ends of the key code element.

13. The system as claimed in claim 1, wherein one or both outer ends of a key code element have a fixed form which has a complementary form to one or both outer ends of a lock code element.

14. The system as claimed in claim 13, wherein one of the key code element and the lock code element comprises a half-moon shaped protrusion and the other code element a half-moon shaped recess.

15. The system as claimed in claim 1, wherein the operating component comprises at least one rotatable pin holder and a spindle, wherein the rotation movement of the spindle opens or closes a valve so a to bring the appliance in the operational mode or safety mode respectively.

16. The system as claimed in claim 1, wherein the operating component is provided with coupling means adapted to couple and uncouple safety-related contacts of a power supply switch of the appliance for securing so as to bring the appliance in the operational mode or safety mode respectively.

17. The system as claimed in claim 1, wherein the lock is adapted to interrupt the power supply or to switch off a control circuit of a power supply of the appliance for securing so as to bring the appliance in the safety mode.

18. The system as claimed in claim 1, wherein the key comprises closing elements for closing the slots in the key and the operating element, wherein the closing elements are of a type which cannot be removed without being damaged.

19. The system as claimed in claim 1, wherein the key further comprises a ring to hold rotational position of the pin with respect to the housing.

20. The system of claim 19, wherein the ring comprises an outer polygon shape that is matingly receivable in the key slots.

21. The system of claim 1, wherein the lock pins comprise springs and pin bodies on each of which the respective spring urges outwardly toward a key-receiving aperture in the lock housing.

22. A lock for use with a safety interlock system for securing an industrial appliance operative in a safety mode or an operational mode, comprising:
    a lock housing and an operating component arranged rotatably in the lock housing, wherein the operating element is adapted to cooperate with an appliance so as to bring the appliance as a result of rotation of the operating component from the operational mode in the safety mode and wherein the operating component is provided with one or more lock code elements which can be positioned in different positions to be selected, wherein the selected positions of the lock code elements correspond to a specific lock code, the lock code elements including at least one lock pin, the at least one lock pin having a first end that places the at least one lock pin in a first key recieving position with respect to the operating element and a second end that places the at least one lock pin in a second key receiving position with respect to the operating element, wherein the lock pin is positionable in one of a plurality of rotational positions to select one of the plurality of key codes, wherein the key codes are defined by an equation $N=(Q*R)^P$, where Q is the number of axial rotation positions of each of the key pins, R is the number of different depth positions of each key pin, and P the number of key pins, and
    wherein the lock is adapted so as to lock the operating component except when a key code of a key is identical to the lock code with a key in the lock housing.

23. The lock of claim 22, wherein the lock code elements are formed by elongate lock pins and the operating component is provided with one or more slots in which the pins can be held in different positions rotated about the longitudinal axis.

24. The lock of claim 23, wherein the lock pins have a part with a rotation-symmetrical cross-sectional form and slots have an at least partially corresponding rotation-symmetrical form.

25. The lock of claim 22, wherein the lock pin comprises a spring and pin body on each of which the respective spring urges outwardly toward a key-receiving aperture in the lock housing.

26. A key for use with a safety interlock system, with a lock having a lock code, for securing an industrial appliance operative in a safety mode or an operational mode, comprising one or more key code elements which can be positioned in different positions to be selected and the selected position of the key code elements corresponds with a specific key code, wherein the key is adapted to change position of an operating component with respect to a lock housing when the key code is identical to a lock code when the key is inserted, wherein the one or more key code elements include at least one pin having an element to hold the rotational position of the pin with respect to a housing.

27. The key of claim 26, wherein the key code elements are formed by elongate key pins which can be fixed in different positions in corresponding slots in the key.

28. An assembly of one or more industrial appliances to be secured and one or more safety interlock systems, wherein the safety interlock system comprises: a lock including a lock housing and an operating component arranged rotatably in the lock housing, wherein the operating element is adapted to cooperate with the appliance so as to bring the appliance as a result of rotation of the operating component from the operational mode in the safety mode and wherein the operating component is provided with one or more lock code elements which can be positioned in different positions to be selected, wherein the selected positions of the lock code elements correspond to a specific lock code;
    a key for unlocking the lock, wherein the key comprises one or more key code elements which can be positioned in different positions to be selected and the selected position of the key code elements corresponds with a specific key code, the key further including a housing, at least one of the one or more key code elements including at least one pin having an element to hold the rotational position of the pin with respect to the housing,
    wherein the lock is adapted so as to lock the operating component with respect to the lock housing except when the key code is identical to the lock code when the key is inserted, and
    wherein the key codes are defined by an equation $N=(Q*R)^P$, where Q is the number of axial rotation positions of each of the key pins, R is the number of different depth positions of each key pin, and P the number of key pins.

29. The assembly of claim 28, wherein the industrial appliance includes at least one of a petrochemical appliance, an electrical appliance, an electrical installation, and chemical plant appliance.

30. The assembly of claim 28, wherein the length of the pin defines another of a plurality of different key codes for the pin at a same rotational position.

* * * * *